F. P. SNOW.
IRRIGATING VALVE.
APPLICATION FILED OCT. 18, 1916.
1,287,127.
Patented Dec. 10, 1918.
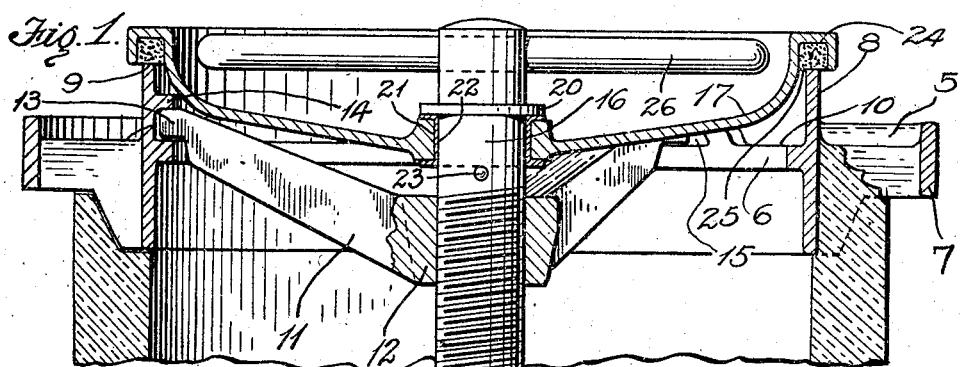
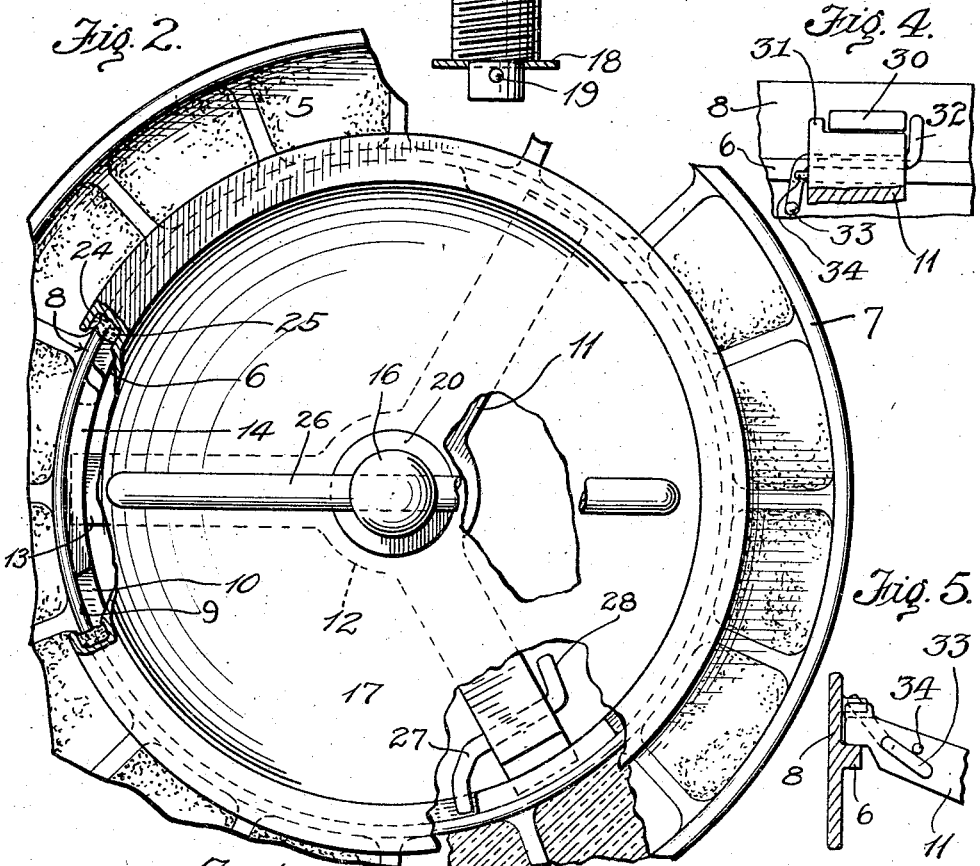
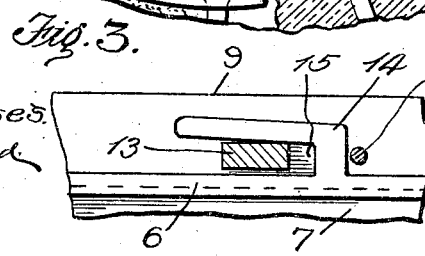
Inventor.
Frank P. Snow.
By
Russell Severance,
Atty.
Witnesses

UNITED STATES PATENT OFFICE.

FRANK P. SNOW, OF LOS ANGELES, CALIFORNIA.

IRRIGATING-VALVE.

1,287,127.     Specification of Letters Patent.     Patented Dec. 10, 1918.

Application filed October 18, 1916. Serial No. 126,286.

*To all whom it may concern:*

Be it known that I, FRANK P. SNOW, a citizen of the United States, residing at Los Angeles, in the county of Los Angeles and State of California, have invented certain new and useful Improvements in Irrigating-Valves, of which the following is a specification.

This invention relates to improvements in valve mechanisms and especially to a valve which is adapted for use upon the ends of stand pipes or in other places where it is desired to control the outflow of water or other material from a pipe or other duct.

It is an object of the invention to provide a valve which is carried by a removable support adapted to be held in a duct or stand pipe or other channel way for controlling the movement of water and other materials.

It is also an object of the invention to provide a valve suitable for irrigating purposes, the stem of which adjustably engages a supporting spider which may be removably mounted in an opening or channel through which materials are to flow, whereby the valve may be opened to any desired extent or entirely removed from the channel way of the said materials for offering no obstructions therein, or may be properly held in said channel way and tightly seated for completely cutting off all flow of materials.

In the accompanying drawing forming a part of this specification:

Figure 1 is a transverse vertical sectional view through the improved valve forming subject matter of the present invention.

Fig. 2 is a top plan view of the same portions being broken away to better reveal the structure.

Fig. 3 is a detail fragmentary view showing a portion of the casing or band of the device with a spider retaining recess.

Fig. 4 is a fragmentary detailed view partially in section, of one end of a spider arm showing a modified form of fastening means carried thereby.

Fig. 5 is a detailed sectional view through a portion of the valve seat ring, and showing the fastening means illustrated in Fig. 4, in side elevation.

The device of the present invention is designed to produce a valve which may be mounted in any channel way or opening, pipe or duct for controlling the passage of materials and particularly of water or other liquids, whereby its flow may be permitted to a greater or less degree or entirely checked, or the valve may be entirely removed when the full flow of materials is desired, whereby no obstruction whatever will then be offered to the passage of said materials. A valve of this kind is found especially useful in connection with irrigating systems where it can be mounted or otherwise secured in stand pipes or upon the end of any kind of piping for regulating the distribution of water upon the ground.

In the accompanying drawing, a preferred form of the valve mechanism has been disclosed and the details and features of the invention will now be more specifically described, reference being had thereto. In the said drawing, 5 indicates an attaching member or ring having a central opening at 6 for the passage of liquids or other materials to be controlled. The member 5 may be secured within or upon a stand pipe or a duct of any kind, in any suitable manner, or said member may be provided with an attaching edge portion 7, having an outer ring and a series of connecting partitions joining the ring with the body portion of the member 5. Cement receiving apertures or recesses are thus formed in said member 5, and cement applied on the end of a pipe and extending into said apertures form anchoring projections for firmly securing the member 5 in place.

Projecting from the member 5, a short distance back from the edge is a flange 8 extending entirely around the opening 6, the outer edge of said flange forming a valve seat 9. The edge of the member 5 which extends inside the flange 8 forms a ledge or support 10 for the cross bar or spider which carries the valve proper. Adapted to engage said ledge and offer proper support for the valve and its stem is a frame or spider 11. The said spider is usually made with three bar portions which radiate from a central hub 12, the outer ends of said bars or spider arms being shaped at 13 to fit upon the said ledge 10 and within the flange 8, the length of the arms or bars of the spider being such as to prevent the spider from slipping off the ledge 10. The central portion of the spider is usually depressed below the member 5 to facilitate a proper seating of the valve plate, when said valve plate is formed to properly engage the valve seat, and also to offer as little obstruction as possible to the flow of materials through the opening 6 when the spider is in place.

The said spider 11 is removably held upon the ledge 10 by inwardly extending angular projections 14 upon the inner surface of the flange 8, which projections form sockets or recesses at 15 for receiving the ends of the spider arms. The ends of the spider arms may be turned in the sockets 15, by twisting the spider when the valve is opened and elevated by its stem sufficiently to reach the spider arms with the fingers. A twist of the spider in the opposite direction will of course also loosen the said arms' ends and permit the removal of the spider from the ledge 10. One of the arms of the spider is provided with a pivoted latch 27, one end of which may be dropped behind the shouldered portion of a projection 14 at the closed end of the socket 15, to prevent the spider arm from moving out of the socket when the spider is to be locked in place. The other end of the latch 27, which is usually bent wire, forms a handle 28 which may be used to turn the device back and forth for locking or unlocking the spider.

The hub 12 of the spider is provided with a threaded aperture adapted to receive the threaded portion of a valve stem 16 which carries the valve plate 17. A washer 18 is secured to the inner reduced end of the valve stem 16 by a pin 19, so that the valve stem is limited in its upward movement thereby and will not therefore become separated from the spider. The valve stem 16 is also usually provided with an annular projection 20 against which the valve plate 17 fits. The said valve plate 17 is provided with a central opening 21 adapted to fit snugly upon the valve stem 16 and any suitable packing material may be interposed between the walls of said opening and the said stem 16 to prevent leakage. A pin 23 holds the plate snugly against the annular projection 20.

While the valve plate 17 may be of any desired shape, it is preferably made with the central part curved inwardly and considerably depressed below the outer edge portions which engages the valve seat as will be readily understood by reference to Fig. 1 of the drawing. The peripheral edge of the valve plate 17 is preferably cast or formed with an inwardly facing channel or groove 24 usually made wider than the valve seat and adapted to carry packing material 25. When the said packing material is tightly fitted or calked in the said channel or groove 24 it affords an admirable means of facilitating a tight seating of the valve and making a non-leaking closure. The curved portion of the valve plate adjacent to the channel 24 will prevent the valve seat from engaging any portion of the plate except the said packing, whereby the packing will always properly register with said seat, as will be readily understood with reference to Fig. 1. The depressed portion of the valve plate 17 also accommodates a handle bar 26 which is attached to the end of the valve stem so that said handle does not project beyond the edges of the valve plate.

It will be evident that minor changes in the shape and detail features of the device may be made without departing from the spirit of the invention and that a supporting member or bar having any desired number of arms may be employed, a corresponding number of sockets 15 being usually provided. The said sockets afford what might be termed a bayonet joint connection for the spider which can thus be readily secured in position or removed therefrom.

It will be evident that by turning the screw stem 16 of the valve, that the valve may be unseated to a greater or a less degree according to the amount of water that it may be desired to have flow from a pipe or duct. By opening the valve sufficiently to disengage and remove the spider arms from the sockets 15, it will be understood that the entire valve and spider may be removed and laid aside for permitting an unobstructed flow of water from the pipe or outlet to its full capacity.

The projections for holding the spider 11 in place may be varied in shape within the spirit of the invention. Thus as shown in Fig. 4, of the drawing, projections 30 may be used, which are in effect, merely inwardly extending lugs. One of the spider arms 11 may be cast with an upwardly projecting lug or projection 31 so that when the spider is turned beneath the projections 30, the said lug 31 will engage the edge of one of said projections 30, limiting the turning of the spider in that direction. A bent wire latch 32 similar to the latch 27 may be employed on the opposite arm, its outer end being adapted to drop behind the lug 30 at the opposite end thereof from the end which is engaged by the lug 31, as clearly shown in Fig. 4, preventing the turning of the spider in the opposite direction.

The latch 32 has an operating end portion 33 which engages a stop pin 34 as shown in Figs. 4 and 5. The latching ends of the device will thus not fall below the point where it will engage the lug 30. The effect of the latch 32 is substantially the same as the effect of the latch 27 and makes it possible to lock the spider with a straight projection 30 instead of the shoulder projection 14. It is evident that the minor details of the invention may be altered without departing from the spirit of the invention.

What is claimed is:—

1. A valve mechanism comprising a member having a valve seat thereon and an inwardly projecting support having sockets, a supporting member having arms adapted to engage said sockets with a bayonet joint connection whereby the member may be readily put in place or removed, a valve stem having a threaded engagement with said member, a valve plate carried thereby and a latch on said support adapted to lock the same against disengagement from said sockets.

2. A valve mechanism comprising a member having a valve seat thereon and a central opening for the passage of materials, a removable spider mounted in said opening, a valve plate adjustable on the spider and having an edge seat engaging portion, said valve plate having curved portions leading to said edge seat engaging portion for insuring a proper seating of the plate and a screw valve stem for adjusting the valve with respect to the spider and the valve seat.

3. A valve mechanism comprising a seat carrying attaching member having sockets upon its inner surface open at one end, a spider member having arms, the ends of which may engage said sockets a latch member journaled in one of said arms and having an end portion adapted to be turned behind the closed end of a socket for locking the spider in place, and a valve adjustably carried by said spider.

In testimony whereof, I have hereunto set my hand, in presence of two witnesses.

FRANK P. SNOW.

Witnesses:
CASSELL SEVERANCE,
EARLE R. POLLARD.

Copies of this patent may be obtained for five cents each, by addressing the "Commissioner of Patents, Washington, D. C."